(12) United States Patent
Lim et al.

(10) Patent No.: US 9,618,324 B2
(45) Date of Patent: Apr. 11, 2017

(54) APPARATUS AND METHOD FOR GENERATING TOMOGRAPHY IMAGES

(71) Applicants: Samsung Electronics Co., Ltd., Suwon-si (KR); Korea Advanced Institute Of Science and Technology, Daejeon (KR)

(72) Inventors: Jae-guyn Lim, Seongnam-si (KR); YongKeun Park, Daejeon (KR); Jae-duck Jang, Daejeon (KR); Hyeonseung Yu, Daejeon (KR); Seong-deok Lee, Seongnam-si (KR); Woo-young Jang, Seongnam-si (KR); Hyun Choi, Yongin-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 83 days.

(21) Appl. No.: 14/081,691

(22) Filed: Nov. 15, 2013

(65) Prior Publication Data

US 2014/0146324 A1    May 29, 2014

(30) Foreign Application Priority Data

Nov. 26, 2012    (KR) .......................... 10-2012-0134861

(51) Int. Cl.
*G01B 9/02*    (2006.01)
*G01B 11/02*    (2006.01)

(52) U.S. Cl.
CPC ..... *G01B 9/02091* (2013.01); *G01B 9/02038* (2013.01); *G01B 9/02087* (2013.01)

(58) Field of Classification Search
CPC ............ G01B 9/02017; G01B 9/02038; G01B 9/02087; G01B 9/02091
See application file for complete search history.

(56) References Cited

U.S. PATENT DOCUMENTS 5,321,501 A * 6/1994 Swanson et al. ............. 356/479
5,502,514 A * 3/1996 Vogeley et al. ............... 348/771
(Continued)

FOREIGN PATENT DOCUMENTS

CN    101238347 A    8/2008
CN    101405562 A    4/2009
(Continued)

OTHER PUBLICATIONS

Translation of FR2943145A1, Boccara, obtained from Espacenet on Jan. 8, 2016.*
(Continued)

*Primary Examiner* — Michael A Lyons
(74) *Attorney, Agent, or Firm* — NSIP Law

(57) ABSTRACT

Provided is an apparatus and method for generating tomography mages, the apparatus including a detection unit configured to modulate each of incident beams into at least two basic modulated incident lights on the basis of at least a basic modulation parameter and into a target modulated incident light on the basis of a target modulation parameter, and to detect at least two basic interference signals and a target interference signal of an object; and an imaging unit configured to analyze the at least two basic interference signals to output a set target modulation parameter, to process the target interference signal as a target image of the object, and to output the target image.

23 Claims, 9 Drawing Sheets

(56) References Cited

U.S. PATENT DOCUMENTS

| | | | |
|---|---|---|---|
| 6,525,863 B1* | 2/2003 | Riza | 359/290 |
| 7,480,058 B2 | 1/2009 | Zhao et al. | |
| 2004/0135972 A1* | 7/2004 | Della Vecchia et al. | 351/246 |
| 2007/0035743 A1* | 2/2007 | Vakoc et al. | 356/495 |
| 2007/0188765 A1* | 8/2007 | Zhao et al. | 356/479 |
| 2007/0263226 A1* | 11/2007 | Kurtz et al. | 356/492 |
| 2008/0002211 A1 | 1/2008 | Park et al. | |
| 2009/0086296 A1* | 4/2009 | Renaud-Goud | 359/9 |
| 2009/0128824 A1 | 5/2009 | Leitgeb et al. | |
| 2011/0096291 A1* | 4/2011 | Buckland et al. | 351/206 |
| 2011/0134436 A1 | 6/2011 | Podoleanu et al. | |
| 2012/0002164 A1 | 1/2012 | Yamamoto et al. | |
| 2012/0257197 A1 | 10/2012 | Feldkhun et al. | |

FOREIGN PATENT DOCUMENTS

| | | |
|---|---|---|
| FR | 2 943 145 A1 | 9/2010 |
| JP | 2007-242747 | 9/2007 |
| JP | 2009-080132 | 4/2009 |
| WO | WO 2011/037980 A2 | 3/2011 |

OTHER PUBLICATIONS

Extended European Search Report issued on Apr. 9, 2014 in counterpart of European Application No. 13194409.2 (7 Pages in English).

I.M. Vellekoop and A. P. Mosk. "Phase control algorithms for focusing light thorough turbid media." Optics Communications 281.11 (Feb. 2008) pp. 3071-3080.

Chinese Office Action issued on May 16, 2016 in counterpart Chinese Patent Application No. 201310435950.2 (8 pages in English; 6 pages in Chinese).

* cited by examiner

APPARATUS AND METHOD FOR GENERATING TOMOGRAPHY IMAGES

CROSS-REFERENCE TO RELATED APPLICATIONS

This application claims the benefit under 35 U.S.C. §119(a) of Korean Patent Application No. 10-2012-0134861 filed on Nov. 26, 2012 in the Korean Intellectual Property Office, the entire disclosure of which is incorporated herein by reference for all purposes.

BACKGROUND

1. Field

The following description relates to apparatuses and methods for generating tomography images by enhancing an observable transmission depth.

2. Description of the Related Art

Tomography is a technology for capturing tomography images of objects by using penetrating waves, and is utilized in various fields and requests for more precise tomography images have increased. In medical diagnosis and treatment applications, generating more precise tomography images has emerged as a significant issue.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for generating tomography images, the apparatus including: a detection unit configured to modulate each of incident beams into at least two basic modulated incident lights on the basis of at least a basic modulation parameter and into a target modulated incident light on the basis of a target modulation parameter, and to detect at least two basic interference signals and a target interference signal of an object; and an imaging unit configured to analyze the at least two basic interference signals to output a target modulation parameter, to process the target interference signal as a target image of the object, and to output the target image.

The detection unit may include a modulator configured to modulate each of the incident beams into the at least two basic modulated incident lights and the target modulated incident light; and an interferometer configured to extract the at least two basic interference signals and the target interference signal from response signals of the object.

The modulator may include a spatial light modulator that modulates the wave front of the incident beam into the at least two basic modulated incident lights and the target modulated incident light.

The modulator include a digital micro-mirror device (DMD) that includes an array of micro-mirrors configured to modulate the incident beam by setting on/off position of each of the micro-mirrors.

The modulator may include a digital micro-mirror device (DMD) that includes an array of micro-mirrors where different numbers of micro-mirrors form a unit of micro-mirror, and the unit is configured to modulate the incident beam by setting on/off position of each unit.

The modulator may include a digital micro-mirror device (DMD) that includes an array of micro-mirrors configured to modulate the incident beam by setting the on/off position of the micro-mirrors based on resolution information.

The modulator may include a digital micro-mirror device (DMD) that includes an array of micro-mirrors where different numbers of micro-mirrors form a unit of micro-mirror; and each unit is configured to modulate the incident beam by setting the on/off position of the unit of micro-mirrors based on resolution information.

The modulator may include a frequency light modulator that modulates the frequency of the incident beam.

The modulator may include a spatial light modulator and a frequency light modulator that modulate the wave front and the frequency of the incident beam to modulate the incident beam The target modulation parameter may be a setting parameter of the modulator, and the target modulated incident light may be reflected or scattered from the object as a plane wave.

The imaging unit may include: an image processor configured to process each of the at least two basic interference signals to generate tomography image signals and to process the target interference signal as an image signal corresponding to a section of the object; and a target setter configured to analyze each of the tomography image signals to set the target modulation parameter.

The image processor may outputs the image signal of the section of the object corresponding to the target interference signal as the target image.

The detection unit may be configured to modulate the incident beam into at least two target modulated incident lights on the basis of at least two target modulation parameters, and the imaging unit is configured to process and combine the at least two target interference signals to generate the target image.

The tomography image generating apparatus may be included in an optical coherence tomography apparatus.

In another general aspect, a method of generating tomography images including setting a target modulation parameter; modulating an incident beam according to the target modulation parameter to scan an object at an optimized transmission depth; detecting the result of scanning the object as an interference signal; and processing the interference signal to generate a tomography image of the object, wherein the setting of the target modulation parameter includes performing at least two basic modulations on the incident beam, scanning the object, and analyzing image signals for at least two interference signals corresponding to each of the basic modulation.

The setting of the target modulation parameter may include analyzing the image signals for at least two interference signals and determining the tomography image signals corresponding to each interference signals; and combining the tomography image signals to set the target modulation parameter.

The determining of the tomography image signals for obtaining the tomography image of the object may be performed for each pixel of the object.

The modulating of the incident beam may include modulating the incident beam by setting on/off position of each micro-mirror of a digital micro-mirror device (DMD) that the incident beam reaches, depending on the target modulation parameter.

The target modulation parameter may be set on a per-unit basis, the unit including different numbers of micro-mirrors.

The modulating of the incident beam according to the target modulation parameter may include modulating the incident beam by modulating the frequency of the incident beam or the wave front of the incident beam according to the target modulation parameter.

In another general aspect, an apparatus for generating tomography images including a modulator configured to modulate each of incident beams into at least two first modulated incident lights on the basis of at least a first modulation parameter and into a second modulated incident light on the basis of a second modulation parameter; an interferometer configured to extract the at least two first interference signals and a second interference signal from response signals of the object; an image processor configured to process each of the at least two first interference signals to generate tomography image signals and to process the second interference signal as an image signal corresponding to a section of the object; and a target setter configured to analyze each of the tomography image signals to set the target modulation parameter for the modulator.

The interferometer may be further configured to split the incident beam into measuring signal and a reference signal.

The image processor may include a demodulator configured to demodulate the first interference signals to generate at least two demodulation signals; and an image generator configured to process the at least two demodulation signals to generate the at least two tomography image signals.

The image generator may process the at least two demodulation signals by converting the demodulation signals from a wavelength domain to a depth domain.

The image generator may be further configured to process the target interference signals to generate a target image.

Other features and aspects will be apparent from the following detailed description, the drawings, and the claims.

Figure 1:
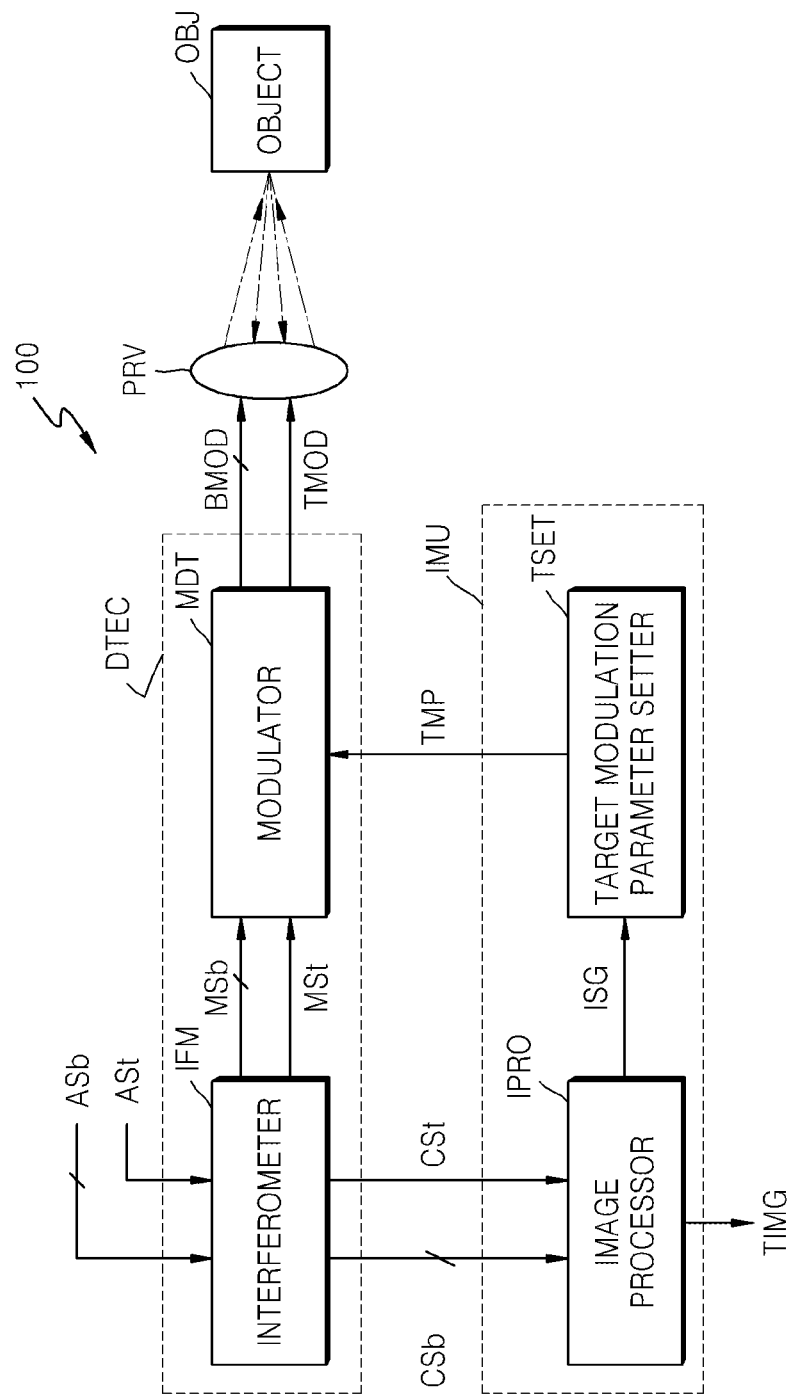
FIG. 1 is a diagram illustrating an example of a tomography image generating apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be apparent to one of ordinary skill in the art. Also, descriptions of well-known functions and constructions may be omitted for increased clarity and conciseness.

Figure 2:
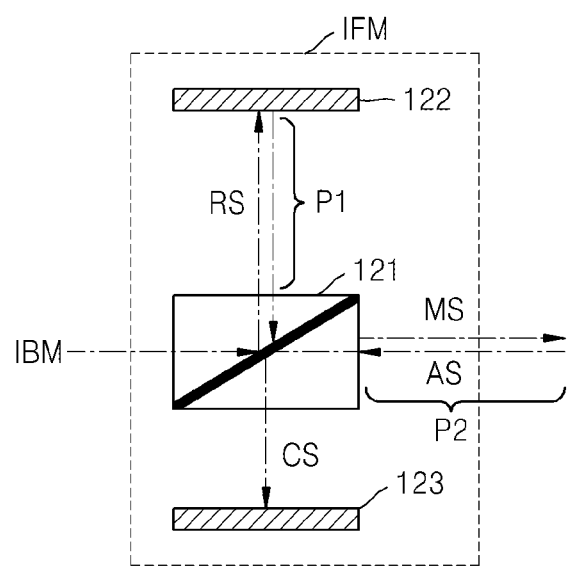
FIG. 2 is a diagram illustrating an example of an interferometer of FIG. 1.

FIG. 1 is a diagram illustrating an example of a tomography image generating apparatus. FIG. 2 is a diagram illustrating an example of an interferometer of FIG. 1. Referring to FIGS. 1 and 2, a tomography image generating apparatus 100 may be an optical coherence tomography (OCT) apparatus that includes a detection unit (DTEC) and an image unit (IMU). The detection unit (DTEC) modulates each of incident beams (IBMs) into at least two basic modulated incident lights (BMODs) based on at least two basic modulation parameters and into target modulated incident lights (TMODs) based on target modulation parameters (TMPs) to detect at least two basic interference signals (CSbs) and target interference signals (CSts) for an object (OBJ).

The incident beams (IBMs) may be emitted from a light generator (not illustrated). The light generator may be positioned inside or outside the tomography image generating apparatus 100. The incident beams (IBMs) may be any optical signal, such as, for example, super luminescent diode (SLD) signal or an edge-emitting light emitting diode (ELED) signal.

The detection unit (DTEC) may include a modulator (MDT) that modulates each of the incident beams (IBMs) into at least two basic modulated incident lights (BMODs) and target modulated incident lights (TMODs), and an interferometer (IFM) that extracts at least two basic interference signals (CSbs) and target interference signals (CSts) from response signals (ASb, ASt) corresponding to at least two basic modulated incident lights (BMODs) and target modulated incident lights (TMODs), respectively. The detection unit (DTEC) may first extract the basic interference signal (CSb) and then extract the target interference signals (CSt) based on a target modulation parameter (TMP) that is set by an image unit (IMU) to be described below. The incident beams (IBMs) may be transmitted to the interferometer (IFM) in a free space or through a transmission medium such as, for example, optical fiber.

As a non-exhaustive example only, the operation of generating the basic interference signal (CSb) may be the same as the operation of generating the target interference signals (CSt) except for a parameter to set the modulator (MDT). To represent that the basic interference signal (CSb) and the target interference signals (CSt) are generated at different times, the operation of generating the basic interference signal (CSb) is distinguished in FIG. 1 from the operation of generating the target interference signals (CSt) by using a separate signal line (an arrow). Measuring signals (MSb, MSt), modulated incident lights (BMODs, TMODs), response signals (ASb, ASt), and interference signals (CSb, CSt) are also illustrated in FIG. 1. In the present example, the measuring signal (MSb) for modulating the incident beams (IBMs) into the modulated incident lights (BMODs) and the measuring signal (MSt) for modulating the incident beams (IBMs) into target modulated incident lights (TMODs) have been represented as separate signal lines just to show that the modulation of the incident beams (IBMs) into the target modulated incident lights (TMODs) and the generation of the target interference signals (CSt) are performed separately from processes for the modulated incident lights (BMODs) and the basic interference signal (CSb), but they may be the same signals. In other words, the modulated incident lights (BMODs) and the target modulated incident lights (TMODs) may be modulation results for the same measuring signals.

FIG. 2 is a diagram illustrating an example of an interferometer (IFM) of FIG. 1. Referring to FIGS. 1 and 2, the interferometer (IFM) receives and splits the incident beams (IBMs) into a measuring signal (MS) and a reference signal (RS). At least two different signal paths (P1 and P2) may be formed in the interferometer (IFM). The measuring signal (MS) split from the incident beams (IBMs) may be transmitted through any one of the differentiated signal paths (P1 or P2) and the reference signal (RS) may be transmitted through the other signal path.

The interferometer (IFM) may split the incident beams (IBMs) into the measuring signals (MSs) and the reference signals (RSs) at a predetermined splitting ratio. The predetermined splitting ratio may be defined as a ratio of the output intensity of the measuring signal (MS) to that of the reference signal (RS). For example, the interferometer (IFM) may split the incident beams (IBMs) into the measuring signals (MSs) and the reference signals (RSs) at a splitting ratio of 5:5. In addition, the interferometer (IFM) may split the incident beams (IBMs) into the measuring signals (MSs) and the reference signals (RSs) at a splitting ratio of 9:1 or other splitting ratios. If the incident beams (IBMs) are split into the measuring signals (MSs) and the reference signals (RSs) by using a beam splitter 121 of FIG. 2, the splitting ratio may be determined depending on the transmissive and reflective properties of the beam splitter 121.

The interferometer (IFM) transmits the measuring signals (MSs) to the modulator (MDT). The measuring signal (MS) of FIG. 2 may be the measuring signal (MSb) for modulating the incident beams (IBMs) into the modulated incident lights (BMODs) of FIG. 1 or the measuring signal (MSt) for modulating the incident beams (IBMs) into the target modulated incident lights (TMODs). As described previously, the measuring signal (MSb) for modulating the incident beams (IBMs) into the basic modulated incident lights (BMODs) or the measuring signal (MSt) for modulating the incident beams (IBMs) into the target modulated incident lights (TMODs) may be the same measuring signal.

Figure 3A:
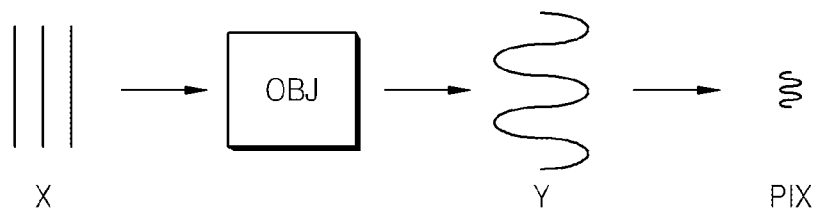
FIG. 3 is a diagram illustrating an example of the operational principle of a modulator of FIG. 1.

Referring back to FIG. 1, according to a non-exhaustive example only, the modulator (MDT) modulates the input measuring signal (MSb) as a basic modulation parameter to output at least two basic modulated incident lights (BMODs). In addition, according to a non-exhaustive example only, the modulator (MDT), on the basis of target modulation parameters (TMPs), modulates input measuring signal (MSt) to output the target modulated incident lights (TMODs). For example, if a plane wave (X) is emitted to a body (OBJ) as illustrated in FIG. 3A, a response signal that is formed by reflection or scattering due to the body (OBJ) may be a spherical wave (Y). Causing energy dispersion of the response signal and blurring to occur on any pixel (PIX) of a tomography image of one point of the body (OBJ).

Figure 3B:
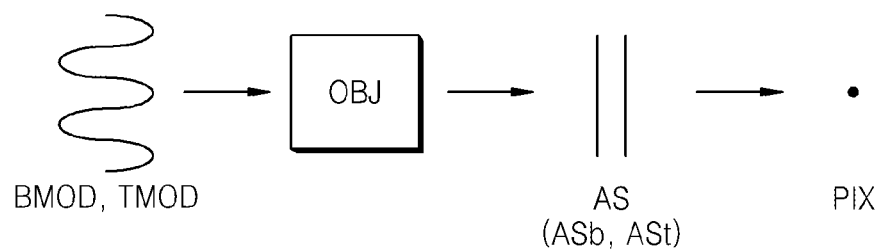

On the other hand, the modulator (MDT), according to a non-exhaustive example only, may modulate the measuring signal (MSb) and measuring signal (MSt) into the basic modulated incident lights (BMODs) and the target modulated incident lights (TMODs) of a spherical wave so that the response signals (ASb and ASt) that are formed by reflection or scattering due to the body (OBJ) may be plane waves as illustrated in FIG. 3B. As a result, as illustrated in FIG. 3B, blur on any pixel of a tomography image of the body (OBJ) may be prevented from occurring.

In addition, if the energy spreading from the response signal (ASb) and response signal (ASt) decreases, a transmission depth of the basic modulated incident lights (BMODs) and the target modulated incident lights (TMODs) toward the body (OBJ) may increase. Thus, if the apparatus for generating tomography images 100 are used, a deeper region of the body (OBJ) (a living tissue) may be observed, and as the observable depth of the living tissue increases, better diagnosis of early cancer or other diseases can be achieved, which increases the survival rates of patients.

Figure 4:
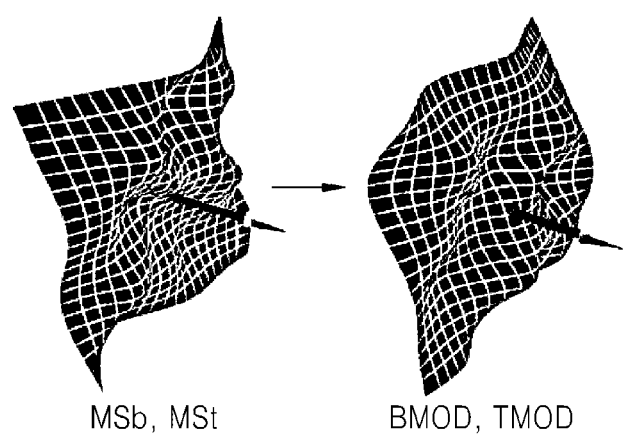
FIG. 4 is a diagram illustrating an example of the modulator of FIG. 1.

FIG. 4 is a diagram illustrating an example of the modulator (MDT) of FIG. 1. Referring to FIGS. 1 and 4, the modulator (MDT) may modulate the wave front of the measuring signal (MSb) or the measuring signal (MSt) to generate the basic modulated incident lights (BMODs) or the target modulated incident lights (TMODs). The modulator (MDT) according to a non-exhaustive example only, may include a spatial light modulator (SLM) such as, for example, a digital micro-mirror device (DMD).

Figure 5:
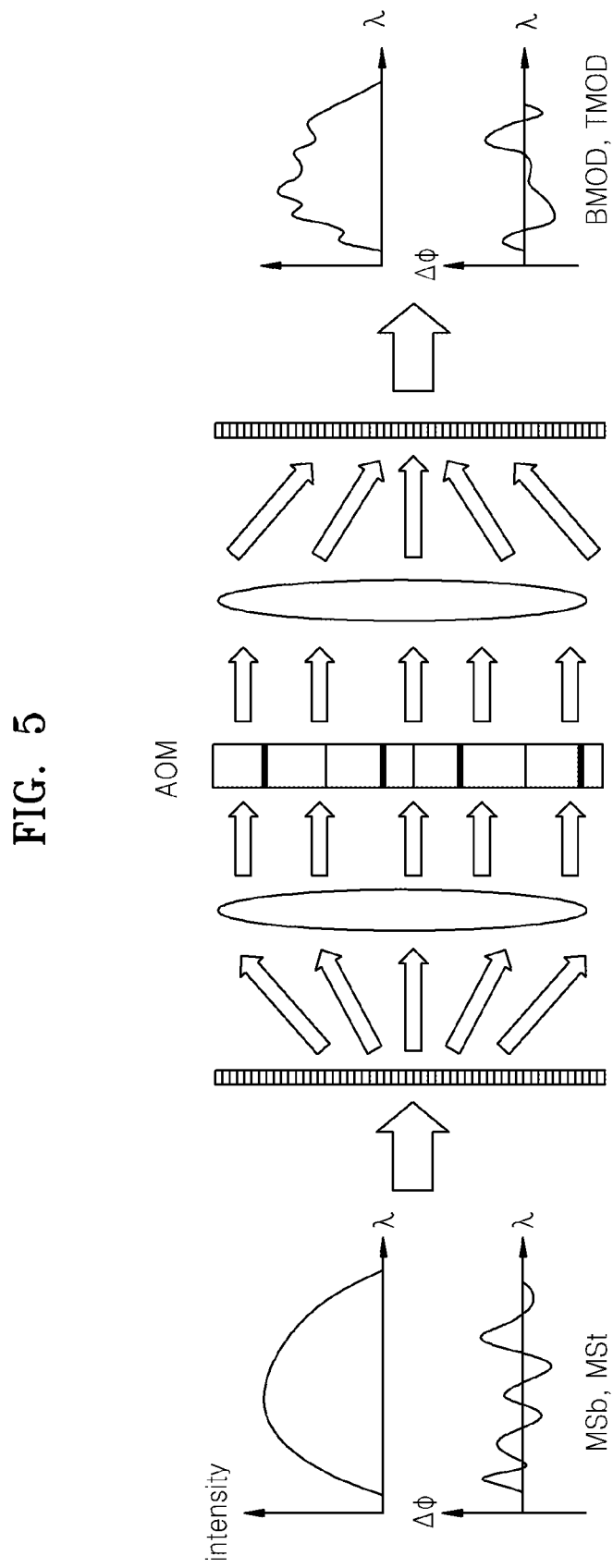
FIG. 5 is a diagram illustrating another example of the modulator of FIG. 1.

FIG. 5 illustrating another example of the modulator of FIG. 1. Referring to FIGS. 1 and 5, the modulator (MDT) may frequency-modulate the measuring signal (MSb) or the measuring signal (MSt) to generate the basic modulated incident lights (BMODs) or the target modulated incident lights (TMODs). The modulator (MDT), according to a non-exhaustive example only, may include a frequency light modulator (FLM) such as, for example, an acoustic optical modulator (AOM).

Figure 6A:
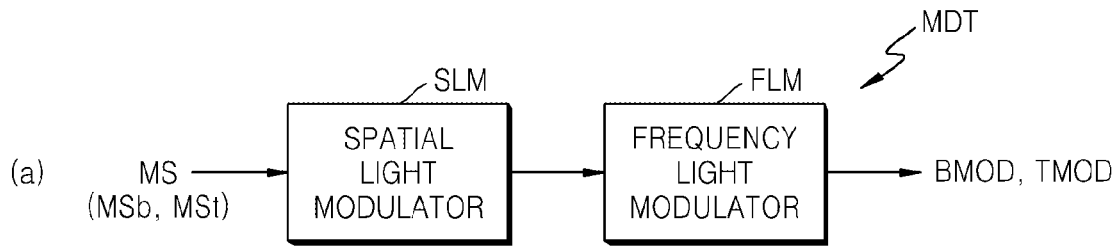
FIG. 6 is a diagram illustrating still another example of the modulator of FIG. 1.
Figure 6B:
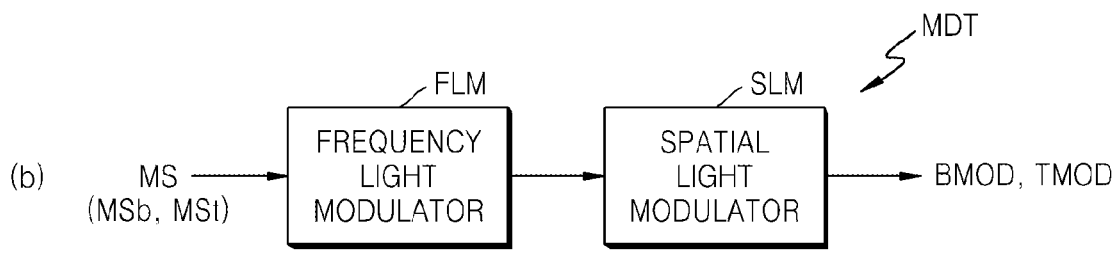

According to yet another example, the modulator (MDT) may modulate the measuring signal (MSb) or the measuring signal (MSt) by using both a spatial light modulator (SLM) and a frequency light modulator (FLM) as illustrated in FIG. 6. FIG. 6A illustrates an example of first modulating the measuring signal (MSb) or the measuring signal (MSt) by using the spatial light modulator (SLM) and then modulating the resultant signal by using the frequency light modulator (FLM), thereby generating the basic modulated incident lights (BMODs) or the target modulated incident lights (TMODs). FIG. 6B illustrates an example of first modulating the measuring signal (MSb) or the measuring signal (MSt) by using the FLM and then modulating the resultant signal by using the SLM, thereby generating the basic modulated incident lights (BMODs) or the target modulated incident lights (TMODs).

As described previously, the detection unit (DTEC) may first detect the basic interference signal (CSb) and then detect the target interference signals (CSt) based on the target modulation parameter (TMP) that is set by the image unit (IMU). The process of generating the basic interference signal (CSb) will be described below. The modulator (MDT) may output at least two basic modulated incident lights (BMODs) through a sequential or parallel modulation operation. The modulator will be described in more detail below.

At least two basic modulated incident lights (BMODs) may be generated by setting parameters for the modulator (MDT) to be different from one another. For example, as will be described below, the position (on/off) of each micro-mirror of an array of digital micro-mirror devices (DMDs) may be set to be different from one another to generate different basic modulated incident lights (BMODs).

Referring back to FIGS. 1 and 2, a probe (PRV) may irradiate the basic modulated incident lights (BMODs) transmitted from the modulator (MDT) to the body (OBJ). The probe (PRV) may be positioned inside or outside the tomography image generating apparatus 100. The basic modulated incident lights (BMODs) irradiated from the probe (PRV) is reflected or scattered inside the body (OBJ) to be transmitted to the interferometer (IFM) with the response signal (ASb) as described previously. The response signal (ASb) may be transmitted to the interferometer (IFM) through a free space or a transmission medium such as, for example, an optical fiber, like the transmission of the measuring signal (MSb).

The interferometer (IFM) generates the basic interference signal (CSb) by the interference of the response signal (ASb) and the reference signal (RS). As shown in FIG. 2, the reference signal (RS) is transmitted through the P1 in the IFM, is reflected from a reference mirror 122, and is transmitted to the beam splitter 121. Part of the reference signal (RS) that is transmitted to the beam splitter 121 is reflected from the beam splitter 121, and passes through the beam splitter 121. The reference signal (RS) passing through the beam splitter 121 causes interference with the response signal (ASb) reflected from the beam splitter 121.

As shown in FIG. 1, the basic interference signal (CSb) is transmitted to the image unit (IMU). However, as another non-exhaustive example, the basic interference signal (CSb) may be transmitted to the image unit (IMU) after processing. For example, after processing the light intensity of each unit (for example, a pixel) of the basic interference signal (CSb) to change it into an electrical signal or a digital value, the basic interference signal (CSb) may be transmitted to the image unit (IMU).

The image unit (IMU) analyzes at least two basic interference signals (CSbs) and outputs target modulation parameters (TMPs). The image unit (IMU) may include an image processor (IPRO) and a target modulation parameter setter (TSET). The image processor (IPRO) may change at least two basic interference signals (CSbs) into at least two tomography image signals (ISG) of the body (OBJ).

Figure 7:
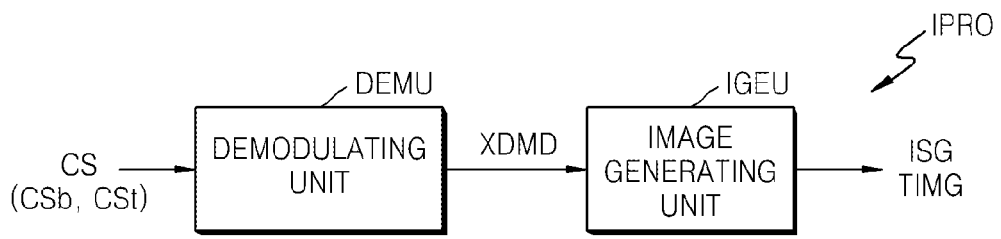
FIG. 7 is a diagram illustrating an example of an example of an image processing unit of FIG. 1.

FIG. 7 is a diagram illustrating an example of an image processing unit (IPRO) of FIG. 1. Referring to FIGS. 1 and 7, an image processing unit (IPRO) may include a demodulation unit (DEMU) and an image generating unit (IGEU). The demodulation unit (DEMU) may demodulate at least two basic interference signals (CSbs) to generate at least two demodulation signals (XDMD). The image generating unit (IGEU) may signal-process each demodulation signal (XDMD) to generate at least two tomography image signals (ISGs). The image generating unit (IGEU) may process signals by converting demodulation signals (XDMD) from a wavelength domain to a depth domain by performing, for example, background-subtraction, k-linearization, and then fast Fourier transform (FFT) on each demodulation signal (XDMD). The image generating unit (IGEU) may process signals by converting demodulation signals (XDMDs) from a wavelength domain to a depth domain by using various other algorithms.

The image processor (IPRO) may generate and output at least two tomography image signals (ISGs) sequentially or simultaneously. If the image processor (IPRO) simultaneously outputs the at least two tomography image signals (ISGs) sequentially generated or sequentially outputs the at least two tomography image signals (ISGs) simultaneously generated, the image processor (IPRO) may further include a buffer, although this is not illustrated in FIG. 7.

Referring back to FIG. 1, the at least two tomography image signals (ISGs) generated through the processes above are transmitted to the target modulation parameter setter (TSET). The target modulation parameter setter (TSET) analyzes the at least two tomography image signals (ISGs) sequentially or simultaneously input to output the target modulation parameters (TMPs). For example, the target modulation parameter setter (TSET) may receive at least two tomography image signals (ISGs) and combine optimal modulation parameters for the tomography image signals (ISGs) corresponding to an optimal image of each unit of the body (OBJ) in order to set the target modulation parameters (TMPs).

Figure 8:
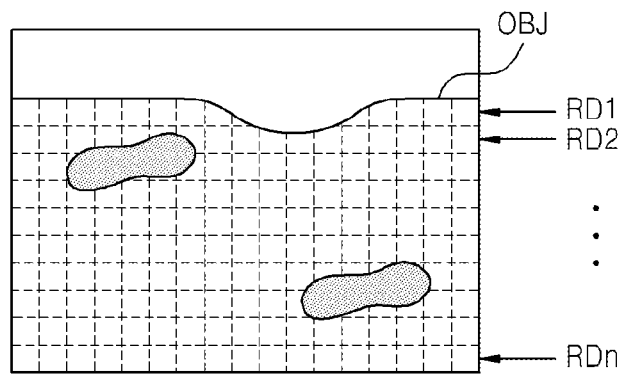
FIG. 8 is a diagram illustrating an example of an object of FIG. 1.

For example, if tomography images of which a first and a second pixel of a first row (RD1) of the body (OBJ) of FIG. 8 are respectively a second and a nth one of the at least two tomography image signals (ISGs), the target modulation parameter setter (TSET) may include modulation parameters (parameters set for a modulator for generating a second basic modulated incident light and a nth basic modulated incident light) corresponding to the second tomography image signal and the nth tomography image signal in the target modulation parameters (TMPs) for a first and a second pixel of the first row (RD1). Regarding other pixels of the first row (RD1) and the pixels of other rows, a modulation parameter corresponding to each pixel may be combined with the target modulation parameters (TMP) in the same way as described above.

As described previously, the target modulated incident lights (TMODs) and the target interference signals (CSt) may be generated in the same process as the basic modulated incident lights (BMODs) and the basic interference signal (CSb), respectively. However, unlike the basic modulated incident lights (BMODs), the modulator (MDT) may generate the target modulated incident lights (TMODs) based on the target modulation parameters (TMP) set through the process above. Methods of generating the TMOD, the target interference signals (CSt), and a tomography image (TIMG) of a section of the body (OBJ) are described below in detail.

Similar to a method of generating the basic modulated incident lights (BMODs), the modulator (MDT) modulates the measuring signal (MSt) to generate the target modulated incident lights (TMODs), and the target modulated incident lights (TMODs) is scanned on the body (OBJ) through the probe (PRV). The target modulated incident lights (TMODs) scanned on the body (OBJ) is spread or scattered and transmitted to the interferometer (IFM) as the response signal (ASt). The interferometer (IFM) generates the target interference signal (CSt) in the same way of generating the basic interference signal (CSb) described previously and transmits the target interference signal (CSt) to the image unit (IMU).

Figure 9A:
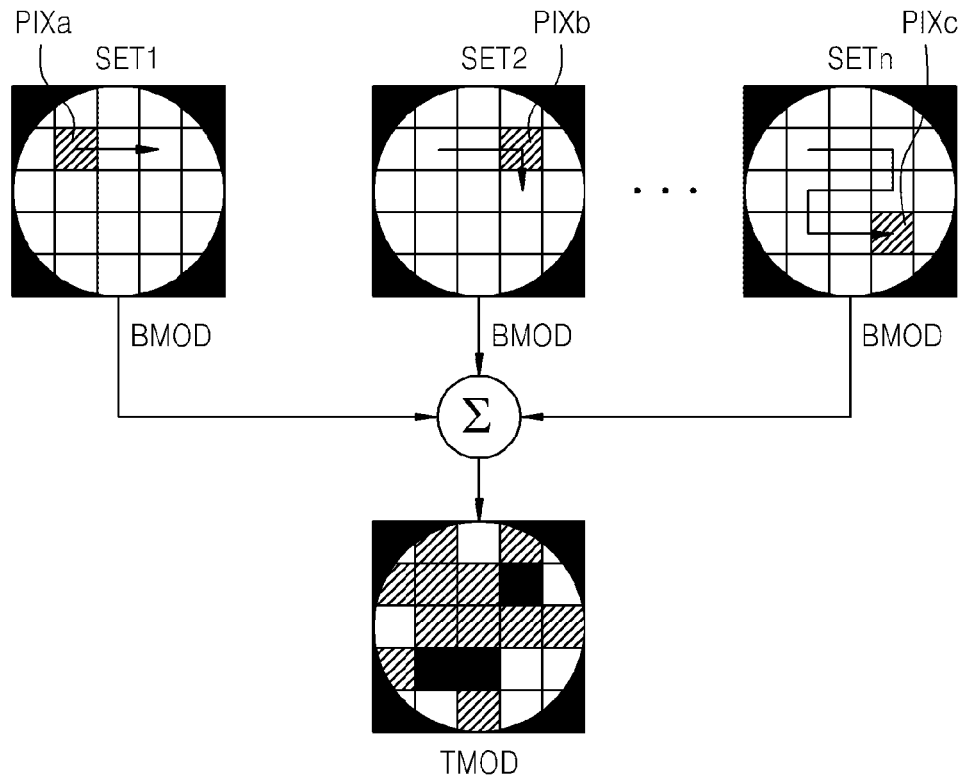
FIG. 9A is a diagram illustrating an operational example of the modulator of FIG. 1.
Figure 9B:
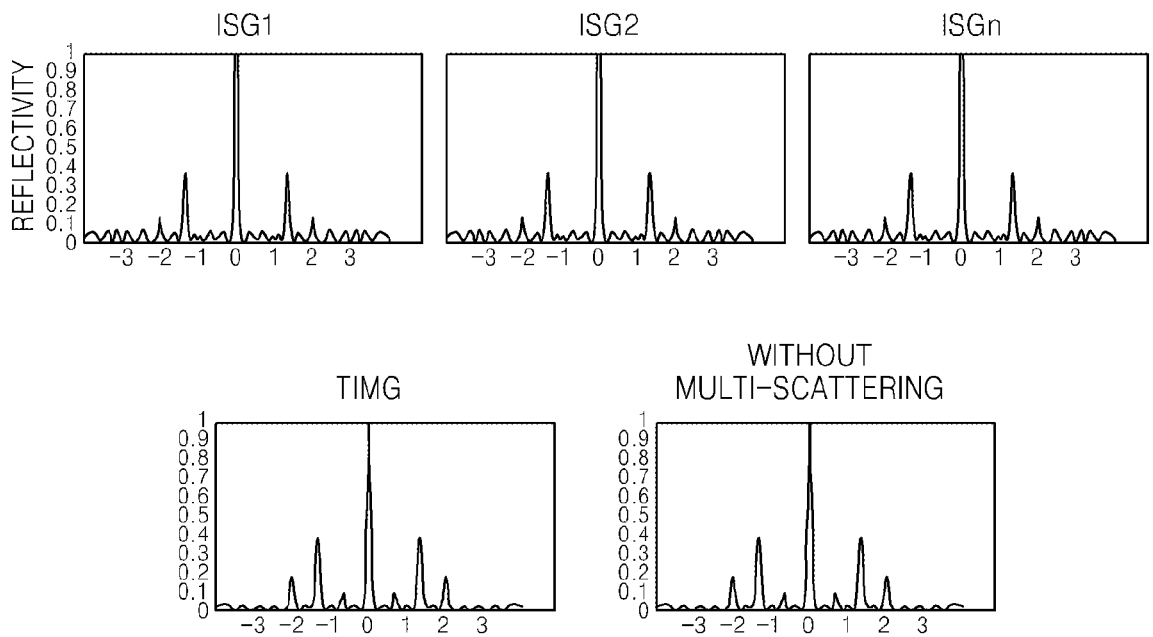
FIG. 9B are diagrams illustrating an operational example of the modulator of FIG.

The detailed operation of the modulator will be described using FIG. 9 as a non-exhaustive example only. FIG. 9 is a diagram illustrating an operational example of the optical modulator of FIG. 1. Referring to FIGS. 1 and 9, the modulator (MDT) according to a non-exhaustive example may be a digital micro-mirror device (DMD). The digital micro-mirror device (DMD) may include an array that includes a plurality of micro-mirrors, as illustrated in FIG. 9A. Each micro-mirror may transmit or block incident lights because its position is adjusted depending on its setting value (a modulation parameter). As a result, modulation operations may be performed while degrees of diffraction of lights (MS) entering the digital micro-mirror device (DMD) vary. Thus, if a micro-mirror transmits light, a corresponding mirror is on, and if a micro-mirror transmits blocks light, a corresponding mirror is off.

For example, if the modulator (MDT) is set to a first setting value (SET1) in FIG. 9A, a micro-mirror of an ath pixel (PIXa) may be on and the other pixels may be off. Alternatively, if the modulator (MDT) is set to a second setting value (SET2) in FIG. 9A, a micro-mirror of a bth pixel (PIXb) may be on and the other pixels may be off. Likewise, if the modulator (MDT) is set to an nth setting value (SETn) in FIG. 9A, a micro-mirror of an nth pixel (PIXn) may be on and the other pixels may be off.

The modulator (MDT) generates different basic modulated incident lights (BMODs) depending on each setting value as described previously. For example, if the modulator (MDT) is set as the first setting value (SET1) in FIG. 9A, a first basic modulated incident lights (BMODs) is generated, and if the modulator (MDT) is set as the second setting value (SET2) in FIG. 9A, a second basic modulated incident lights (BMODs) is generated. Likewise, if the modulator (MDT) is set as the nth setting value (SETn) in FIG. 9A, an nth basic modulated incident lights (BMODs) may be generated. Likewise, the modulator (MDT) may combine each setting value (a basic modulation parameter) and generate the target modulated incident lights (TMODs) that may be set to the target modulation parameters (TMP) and that be irradiated at the optimal transmission depth of the body (OBJ). A method of setting the target modulation parameters (TMP) has been previously described.

The image processor (IPRO) of the image unit (IMU) may image-process the target interference signals (CSt) generated through the operations above to generate a tomography image (TIMG) of a section of the body (OBJ). The method of generating the tomography image (TIMG) by the image processor (IPRO) may be the same as that of generating the tomography image signal (ISG) described previously.

According to the apparatus and method for generating tomography images described above, it is possible to increase the measurable depth of the body (OBJ) by obtaining optimal modulation conditions. Examples in which the apparatus and method for generating tomography images may increase the measurable depth of the body (OBJ) by obtaining optimal modulation conditions operate the modulator (MDT) in a different way from FIG. 9 and will be described below.

Figure 10:
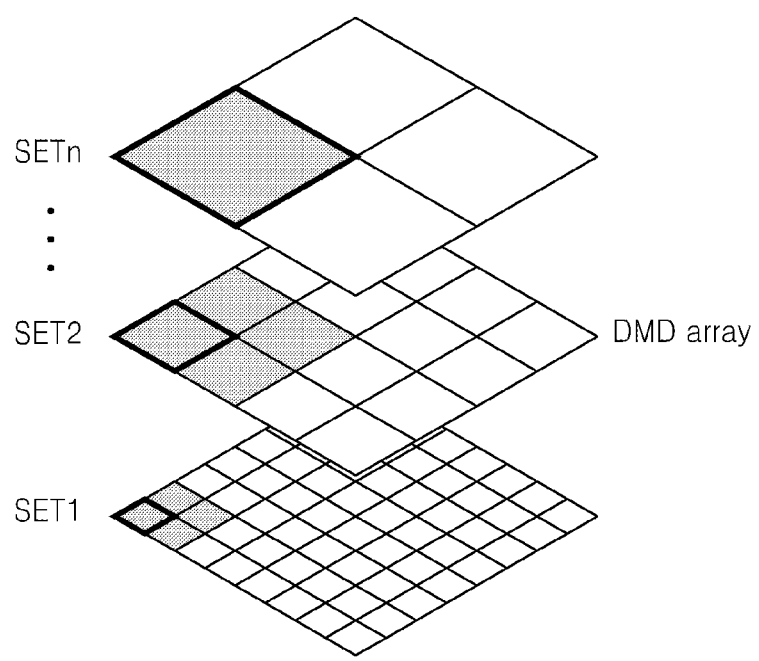
FIGS. 10 and 11 are diagrams illustrating other operational examples of the modulator of FIG. 1.
Figure 11:
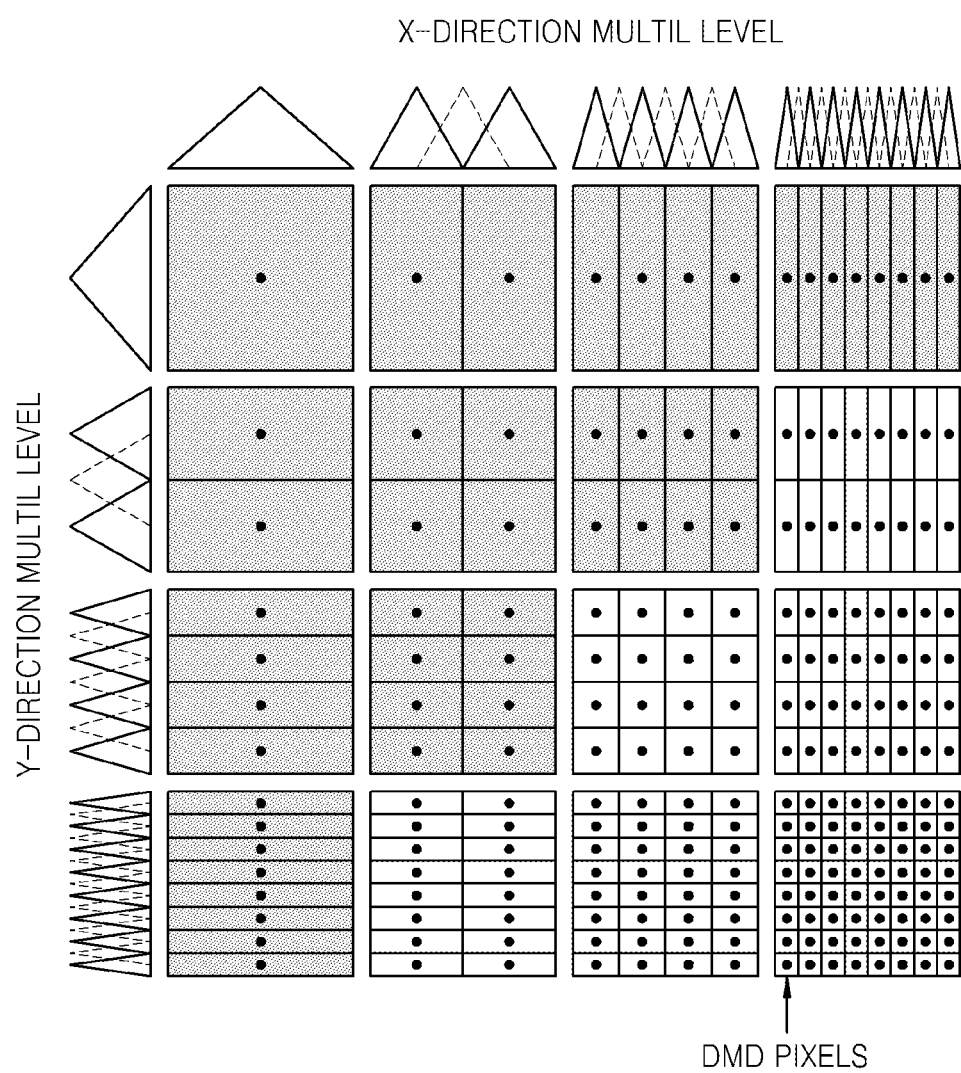

FIGS. 10 and 11 are diagrams illustrating other operational examples of the modulator (MDT) of FIG. 1. Referring to FIGS. 1 and 10, the modulator (MDT) according to a non-exhaustive example may set setting values based on different number of micro-mirrors of an array of digital micro-mirror devices (DMDs) to perform a modulation operation. For example, as illustrated in FIG. 10, the SET1, which is one of the modulation parameters, may be set for each micro-mirror unit of the array of digital micro-mirror devices (DMDs). The SET2 and the SETn, which are other modulation parameters, may be set based on a plurality of micro-mirrors of the array of digital micro-mirror devices (DMDs). For example, as illustrated in FIG. 10, the SET2 may be a value corresponding to the on and off states of four micro-mirrors and the SETn may be a value corresponding to the on and off states of micro-mirrors whose number corresponds to a multiple of the SET2.

The target modulation parameter setter (TSET) analyzes a condition where each setting value may be accounted for and an optimal tomography image (TIMG) of the body (OBJ) may be generated, namely, the transmission depth of the light radiated to the body (OBJ) may be increased, and sets the target modulation parameters (TMP) as described previously.

Referring to FIGS. 1 and 11, the modulator (MDT) according to a non-exhaustive example may set multi-level group setting values for the micro-mirrors (pixels) of the array of digital micro-mirror devices (DMDs) to generate different basic modulated incident lights (BMODs) for the measuring signals (MSs). Each group may be characterized by different resolution information. For example, digital micro-mirror devices (DMDs) are sequentially set from low-level information in the upper left side of FIG. 11 to high-level information in the lower right side of FIG. 11 to generate the basic modulated incident lights (BMODs) for each group. In addition, patterns (groups) having the best signal to noise rate (SNR) with respect to at least two tomography image signals (ISGs) corresponding to the basic modulated incident lights (BMODs) may be combined to be set as the target modulation parameters (TMPs). Thus, the target modulated incident lights (TMODs) the modulator (MDT) may modulate the target modulated incident lights (TMODs) based on the set target modulation parameters (TMP) and the tomography image (TIMG) may be generated from the corresponding target interference signals (CSt).

Figure 12:
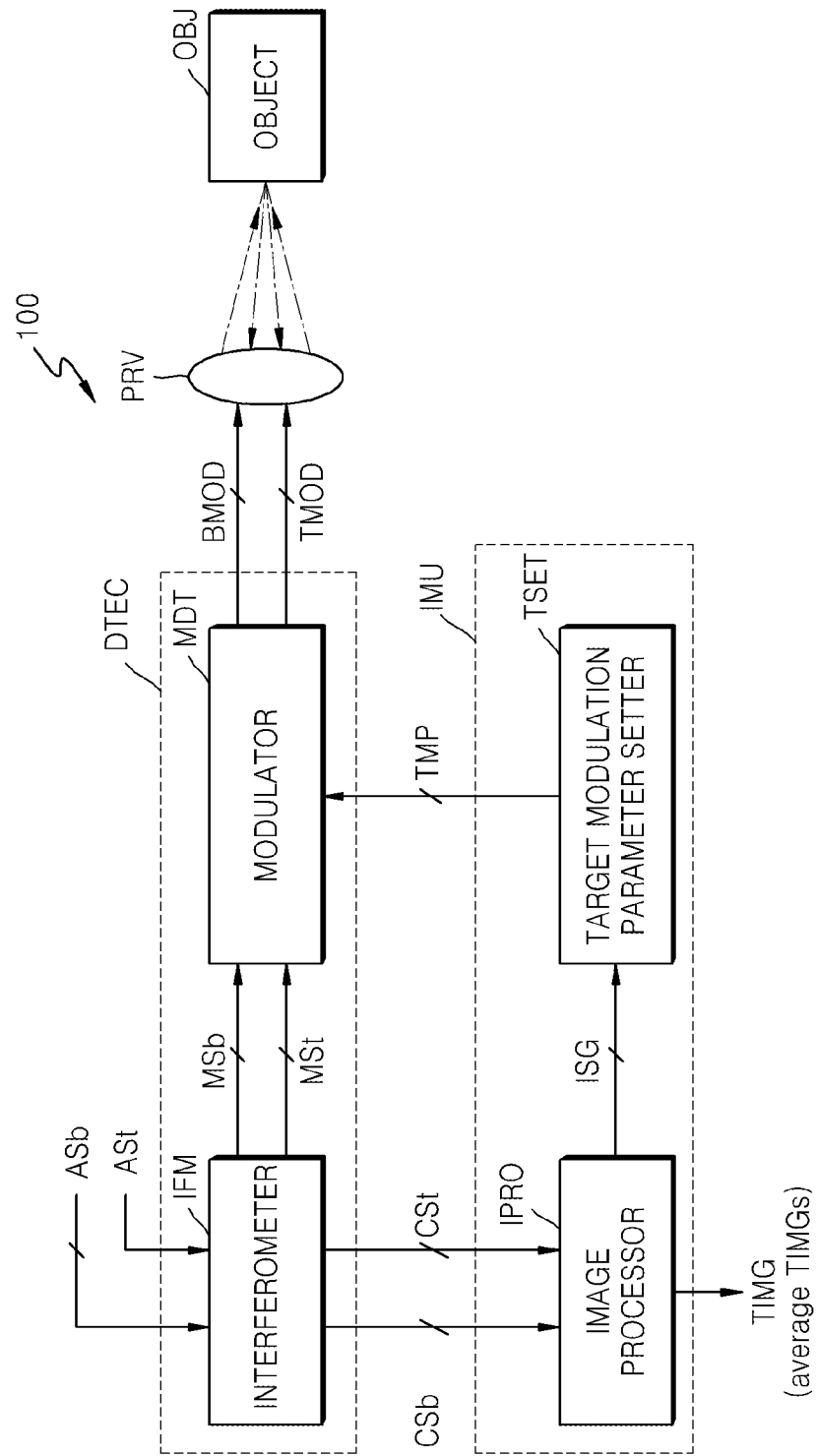
FIG. 12 is a diagram illustrating another example of a tomography image generating apparatus.

FIG. 12 is a diagram illustrating another example of a tomography image generating apparatus 100. Referring to FIG. 12, unlike the tomography image generating apparatus 100 of FIG. 1 that generates one target modulated incident lights (TMODs) for at least two basic modulated incident lights (BMODs), the tomography image generating apparatus 100 of FIG. 12 generates at least two target modulated incident lights (TMODs) that correspond to at least two target modulation parameters (TMPs). For example, an modulator (MDT) of FIG. 12 may set the target modulation parameters (TMP) for a first pixel of the first row (RD1) of the body (OBJ) with respect to the generating condition of a first BMOD (a setting value of the modulator (MDT) (a modulation parameter)) and the generating condition of an nth basic modulated incident lights (BMODs), separately. For example, a first target modulation parameters (TMP) according to the generating condition of the first basic modulated incident lights (BMODs) and a second target modulation parameters (TMP) according to the generating condition of an nth basic modulated incident lights (BMODs) may be set.

At least two target modulated incident lights (TMODs) and at least target interference signals (CSts) may be generated by at least two target modulation parameters (TMPs), and at least two tomography images (TIMG#) may thus be generated. An image processor (IPRO) of the tomography image generating apparatus 100 of FIG. 12 may synthesize at least two tomography images (TIMG#) to generate a final tomography image (TIMG). For example, the image processor (IPRO) of FIG. 12 may equalize the intensities and phases of at least two tomography images (TIMG#) to generate a final tomography image (TIMG) of the body (OBJ).

Only components related to the present example are illustrated in the tomography image generating apparatus 100 of FIGS. 1 and 12. Thus, those skilled in the art may understand that general components except for components illustrated in FIGS. 1 and 12 may be further included. Referring back to FIGS. 1 and 12, the tomography image (TIMG) generated for a section of the body (OBJ) may be stored in a storage unit (not illustrated) or be displayed by a display unit (not illustrated). The storage unit may include, for example, a hard disk drive (HDD), a read only memory (ROM), a random access memory (RAM), a flash memory, or a memory card as an ordinary storage medium. The storage unit and the display unit may be positioned inside or outside the tomography image generating apparatus 100. As another example, the tomography image generating apparatus 100 may include an interface unit (not illustrated). The interface unit may be responsible for inputting and outputting input information regarding a user and an image. The interface unit may include a network module for connection to a network and a universal serial bus (USB) host module for forming a data transfer channel with a mobile storage medium, depending on a function of the tomography image generating apparatus 100. In addition, the interface unit includes an input/output device such as a mouse, a keyboard, a touch screen, a monitor, a speaker, and a software module for running the input/output device. As described above, according to the tomography image generating apparatus and method, more precise tomography images may be generated by enhancing an observable transmission depth and performing modulation by taking into consideration the properties of living tissues.

The apparatuses described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the operating system (OS). The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), CD-ROMs, magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

A number of examples have been described above. Nevertheless, it will be understood that various modifications may be made. For example, the tomography image generating method described above may be embodied as computer codes store on a non-transitory computer readable storage medium. As another example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for generating tomography images, the apparatus comprising:
a detection unit configured to detect a basic interference signal and a target interference signal of an object, and comprising
a beam splitter, and
a modulator, comprising an array of micro-mirrors configured to modulate an incident beam into
a basic modulated incident beam that is incident on an object, by setting an on/off position of a micro-mirror, based on resolution information, and
a target modulated incident beam that is incident on the object, based on a target modulation parameter,
wherein the basic modulated incident beam and the target modulated incident beam comprise spherical waves;
an imaging processor configured to extract a basic interference signal and a target interference signal from response signals, the response signals comprising plane waves formed by the object reflecting or scattering the basic modulated incident beam and the target modulated incident beam, to change the basic interference signal into tomography image signals, to output the target modulation parameter by analyzing the tomography image signals, to process the target interference signal as a target image of the object, and to output the target image, wherein the imaging processor comprises
an image processor configured to process each of the basic interference signal to generate tomography image signals and to process the target interference signal as an image signal corresponding to a section of the object, and
a target setter configured to analyze each of the tomography image signals, and to set the target modulation parameter.

2. The apparatus of claim 1, wherein the detector further comprises:
an interferometer, comprising the beam splitter and a reference mirror, configured to extract the basic interference signal and the target interference signal from response signals of the object.

3. The apparatus of claim 2, wherein the modulator comprises:
a spatial light modulator configured to modulate a wave front of the incident beam into the basic modulated incident beam and the target modulated incident beam.

4. The apparatus of claim 2, wherein the modulator comprises:
a frequency light modulator configured to modulate the frequency of the incident beam.

5. The apparatus of claim 2, wherein the modulator comprises:
a spatial light modulator and a frequency light modulator that modulate the wave front and the frequency of the incident beam to modulate the incident beam.

6. The apparatus of claim 1, wherein the modulator comprises: a digital micro-mirror device (DMD) that includes the array of micro-mirrors, and is configured to modulate the incident beam by setting an on/off position of each micro-mirror.

7. The apparatus of claim 1, wherein the modulator comprises: a digital micro-mirror device (DMD) that includes the array of micro-mirrors, wherein each group of micro-mirrors comprises a variable number of micro-mirrors, and wherein the modulator is configured to modulate the incident beam by setting an on/off position of each unit.

8. The apparatus of claim 1, wherein the modulator comprises: a digital micro-mirror device (DMD) that includes the array of micro-mirrors, and is configured to modulate the incident beam by setting the on/off position of each of the micro-mirrors, based on resolution information.

9. The apparatus of claim 1, wherein the modulator comprises: a digital micro-mirror device (DMD) that includes the array of micro-mirrors, wherein each group of micro-mirrors comprises a variable number of micro-mirrors, and wherein the modulator is configured to modulate the incident beam by setting the on/off position of the group of micro-mirrors, based on resolution information.

10. The apparatus of claim 1,
wherein the imaging processor is configured to process and combine a plurality of target interference signals.

11. The apparatus of claim 1, wherein the tomography image generating apparatus is included in an optical coherence tomography apparatus.

12. A method of generating tomography images, the method comprising:
setting a target modulation parameter;
modulating an incident beam according to the target modulation parameter, to generate
  a basic modulated incident beam that is incident on an object, by setting an on/off position of a micro-mirror that the incident beam reaches, based on resolution information, and
  a target modulated incident beam, that is incident on the object, based on a target modulation parameter,
  wherein the basic modulated incident beam and the target modulated incident beam comprise spherical waves;
detecting response signals to the basic modulated incident beam and the target modulated incident beam, wherein the response signals are formed by the object reflecting or scattering the basic modulated incident beam and the target modulated incident beam, and wherein the response signals comprise plane waves; and
processing the interference signal and generating a tomography image of the object.

13. The method of claim 12, wherein the analyzing of the tomography image signals comprises:
analyzing the tomography image signals for interference signals and determining the tomography image signals corresponding to each of the interference signals; and
combining the tomography image signals.

14. The method of claim 13, wherein the determining of the tomography image signals for obtaining the tomography image of the object is performed for each pixel of an image of the object.

15. The method of claim 14, wherein the target modulation parameter is set on a per-group basis, and wherein each group of micro-mirrors comprises a variable number of micro-mirrors.

16. The method of claim 12, wherein the modulating of the incident beam comprises modulating the incident beam by setting an on/off position of each micro-mirror that the incident beam reaches, depending on the target modulation parameter.

17. The method of claim 12, wherein the modulating of the incident beam according to the target modulation parameter comprises:
modulating the frequency of the incident beam, or a wave front of the incident beam, according to the target modulation parameter.

18. A non-transitory computer readable recording storage medium having a program comprising instructions that perform the method of claim 12, when executed by a computer.

19. An apparatus for generating tomography images, the apparatus comprising:
a detector, comprising:
  a modulator, comprising an array of micro-mirrors configured to modulate incident beams into
    a basic modulated incident beam that is incident on an object, by setting an on/off position of a micro-mirror, based on resolution information, and
    a target modulated incident beam that is incident on the object, based on a target modulation parameter,
    wherein the basic modulated incident beam and the target modulated incident beam comprise spherical waves;
  an interferometer, comprising a beam splitter, configured to extract the first interference signals and a second interference signal from response signals of the object, wherein the response signals are formed by the object reflecting or scattering of the basic modulated incident beam and the target modulated incident beam, and wherein the response signals comprise plane waves;
  an image processor configured to process each of the first interference signals and to generate tomography image signals, and to process the second interference signal as an image signal corresponding to a section of the object; and
  a target setter configured to analyze each of the tomography image signals, and to set the on/off position of the micro-mirror.

20. The apparatus of claim 19, wherein the interferometer is further configured to split the incident beam into measuring signal and a reference signal.

21. The apparatus of claim 19, wherein the image processor comprises:
a demodulator configured to demodulate the first interference signals and to generate demodulation signals; and
an image generator configured to process the demodulation signals and to generate the tomography image signals.

22. The apparatus of claim 21, wherein the image generator processes the demodulation signals by converting the demodulation signals from a wavelength domain to a depth domain.

23. The apparatus of claim 21, wherein the image generator is further configured to process the second interference signals and to generate a target image.

* * * * *